United States Patent [19]

Madey

[11] 3,822,410

[45] July 2, 1974

[54] STIMULATED EMISSION OF RADIATION IN PERIODICALLY DEFLECTED ELECTRON BEAM

[76] Inventor: John M. J. Madey, 2120 Amherst St., Palo Alto, Calif. 94306

[22] Filed: May 8, 1972

[21] Appl. No.: 251,632

[52] U.S. Cl. .................................. 331/94.5, 250/84
[51] Int. Cl. ............................................. H01s 3/00
[58] Field of Search ...................... 331/94.5; 250/84

[56] References Cited
OTHER PUBLICATIONS

Madey, "Stimulated Emission Of Bremsstrahlung in a Periodic Magnetic Field," J.A.P., Vol. 42, No. 5, April 1971, pp. 1,906–1,912.

Primary Examiner—Ronald L. Wibert
Attorney, Agent, or Firm—Townsend & Townsend

[57] ABSTRACT

A tunable generator or amplifier of coherent radiation in the infrared, optical, ultraviolet and X-ray regions with the capability for operation at power levels in excess of a megawatt with high efficiency. A relativistic electron beam is periodically deflected by a transverse magnetic field defined by a linear array of magnets, adjacent magnets having opposing polarities. Each time the electron is deflected it emits a burst of radiation. The combination of the individual bursts yields a beam of radiation of comparatively small angular divergence and small spread in frequency. Due to the difference in the electrons' recoil during emission and absorption, the frequency at which absorption occurs for radiation in the electron beam is slightly higher than that for emission and gain is available due to the stimulated emission of radiation for operation at frequencies on the low frequency side of the spontaneously emitted radiation spectrum.

45 Claims, 9 Drawing Figures

FIG_1

FIG_2

FIG_3

FIG_4

FIG_5

FIG_6

FIG_7

FIG_8

FIG_9

STIMULATED EMISSION OF RADIATION IN PERIODICALLY DEFLECTED ELECTRON BEAM

BACKGROUND OF THE INVENTION

The development of ultraviolet and X-ray lasers has been actively pursued for some time. Such lasers would be useful in materials analysis, spectroscopy, or in X-ray holography for making holograms of complex molecules allowing the subsequent reproduction of enlarged three-dimensional images.

Despite their desirability, short wavelength lasers have not been built prior to the present invention. Probable reasons for the failure to construct short wavelength lasers have to do with the fact that in a conventional laser there must be a "level inversion" so that the rate of stimulated emission exceeds the rate of absorption and the number of optical modes into which the system radiates must be small.

The latter condition arises from the laws governing stimulating emission according to which the stimulated emission transition rate is proportional to the radiated power per mode. A radiating system, even if level inversion has been achieved and the radiated power is high, may exhibit negligible gain if the number of associated optical modes is too high.

The number of modes associated with a system of fixed linewidth increases with the energy of the radiated photon as $E^2 dE d\Omega/(hc)^2$ where $E$ is the photon energy and is proportional to the frequency, $dE$ is the linewidth, $h$ is Planck's constant, and $c$ the speed of light. The quantity $d\Omega$ is the differential solid angle into which the system radiates. Most lasers involve isotropic radiators for which $d\Omega = 4\pi$ stearadians. For radiating systems of identical linewidth, level inversion, and radiated power, the number of modes increases as $E^2$ and the gain decreases as $E^{-3}$. Conversion to wavelength units indicates that the gain will fall as $\lambda^3$ at short wavelengths.

Compensation for the reduction in gain due to the increasing number of modes at short wavelengths can be achieved in conventional lasers only by increasing the radiated power and the degree of level inversion. Complications in the realization of these measures have to date prevented the construction of lasers operating at wavelengths below 1,100 Angstroms.

SUMMARY OF THE INVENTION

The present invention provides a device, operable as an amplifier or oscillator, for generating coherent radiation which can be operated at frequencies within the X-ray region and also within the infrared, optical, and ultraviolet regions of the spectrum. The device can be operated to produce a continuous beam of radiation with a power in excess of 1 million watts. In its broadest aspect the present invention provides an apparatus for the amplification of radiation emitted spontaneously or injected from an external source which comprises means for generating a high energy electron beam, and means for periodically deflecting the beam to thereby separate the frequencies at which radiation is emitted and absorbed within the electron beam and thus obtain a beam of substantially coherent radiation.

In the preferred embodiment of the invention the electron beam generating means generates a continuous electron beam, the deflecting means comprises a linear array of magnets which form an alternating magnetic field, hereinafter sometimes referred to as a "periodic magnetic field," of alternating polarity, and the separating method comprises the use of the difference in the electrons' recoil during the emission and adsorption of radiation.

A device described by Motz in the Journal of Applied Physics, Volume 22, page 527 (1951) and in Volume 24, page 826 (1953) of the same journal, generated incoherent radiation using an undulating electron beam in an alternating magnetic field. The device required a bunched beam in which the bunch spacing was a multiple of the period of the magnetic field. No amplification was involved in this device. For the purposes of power generation, the capabilities of the device did not extend beyond the millimeter region.

A subsequent paper by Motz and Nakamura in the *Proceedings of the Symposium on Millimeter Waves* (Polytechnic Press, Brooklyn, 1960) p. 155 presented an analysis of the amplification of an electromagnetic wave due to interaction with an undulating relativistic electron beam in an alternating magnetic field. However, Motz' analysis failed to consider the practical effects of the quantization of the electromagnetic field. The result of the analysis was that the gain was too small for practical application.

Use of induced Compton scattering for amplification in a laser was suggested by Pantell, Soncini, and Puthoff in the IEEE Journal of Quantum Electronics, Volume 4, page 905 (1968). Radiation, in their device, can be interpreted as occurring due to the periodic deflection of an electron beam in a microwave radiation field. Gain, however, was restricted to the infrared region by practical limits on the amplitude of the microwave radiation. Thus, the embodiment of Pantell's device differs substantially from the present invention.

The present invention employs the radiation emitted by a relativistic electron beam which moves through a periodic transverse dc magnetic field. Gain is available from the far infrared through the visible and the ultraviolet to the X-ray region and at radiation powers that exceed the prior art 1 megawatt maximum power for the continuous emission of coherent radiation by many multiples.

The present invention is based on the realization that when a high energy electron is deflected it emits radiation, i.e., photons, and simultaneously therewith the electron recoils. The recoil, though minute, distinguishes the relationship between the electron and photon in the emission process from that which applies when a photon is absorbed. The frequency of the radiation absorbed by an electron of given energy is slightly higher than the frequency which would be emitted at that energy. Therefore, the emission and absorption spectra do not quite overlap and there will always be a range of frequencies for which the transition rate for emission exceeds the rate for absorption.

When coherent radiation is present in the electron beam the emission and absorption rates increase in proportion to the number of photons per unit volume. At those frequencies for which the transition rate for emission exceeds the rate for absorption there will be, on the average, more photons emitted than in the absence of the radiation. Thus, stimulated emission analogous to stimulated emission in conventional lasers is obtained although the device of the present invention differs from conventional lasers in all other respects. Nevertheless, the presence of stimulated emission justifies the term "laser" for the coherent high frequency radiation generator of the present invention.

A laser constructed in accordance with the invention is tunable to adjust its frequency and has a very high, heretofore unattainable, efficiency. The radiation can be linearly, circularly or elliptically polarized with appropriate design of the magnets in the periodic magnet array. Furthermore, radiation takes place along the direction of the electron beam only. Potentially dangerous radiation in the backward direction is thus eliminated.

The frequency and amplitude of the emitted radiation can be modulated without the need for additional elements in the radiation beam by means of appropriate variations in the parameters of the periodic magnetic field.

Consequently, the present invention provides a laser which can operate at frequencies which were unattainable with prior art lasers. The tunability makes such lasers ideally adapted for use in materials analysis and spectroscopy. Its continuous power output greatly exceeds power outputs that could be attained with prior art lasers and its efficiency and uni-directional gain make it especially attractive for use in high-power applications.

DESCRIPTION OF THE PREFERRED EMBODIMENTS

The criteria for amplification in the invention are analogous to those in a conventional laser in that the transition rate for stimulated emission must exceed the rate for absorption and that the radiated power per mode must be large enough to supply the required gain. The existence of gain in the invention is traceable to the difference in the electrons' recoil during emission and absorption. The consequence of the electrons' recoil is that the frequency of the emitted radiation is somewhat lower than the absorbed radiation. This effect appears explicitly in the gain formula set forth below.

The magnitude of the gain depends on the spectrum and angular distribution of the emitted radiation since these determine the relative effectiveness of the electrons' recoil in separating the emission and absorption lines and the number of optical modes into which the electrons radiate. The paragraphs which follow briefly discuss the angular distribution and spectrum of the radiation emitted by the electrons in the invention.

The radiation emitted by a relativistic electron beam in a transverse magnetic field is intense and highly collimated. In the discussion which follows the quantity, $\gamma = \sqrt{1-(v/c)^2}$ where $v$ is the electron's velocity and $c$ the speed of light. The energy of a particle is given by $E = \gamma mc^2$ where $m$ is the particle's rest mass.

Figure 1:
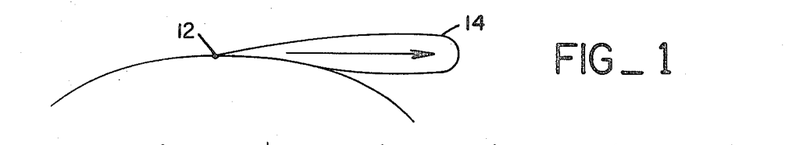
FIG. 1 is a schematic diagram illustrating the emission of burst of radiation by an electron in instantaneous circular motion.

Referring now to FIG. 1, the radiation emitted by an electron 12 in instantaneous circular motion, as in a uniform transverse field, fills a cone 14 that is parallel to the instantaneous velocity of the electron. The cone has a half angle of approximately $1/\gamma$. For a 5G eV electron beam (5billion volts), $\gamma = 10^4$ and the solid angled $\Omega$ for the number of instantaneously coupled optical modes would be of the order of $10^{-8}$ fewer modes than for an isotropic radiator.

Figure 2:
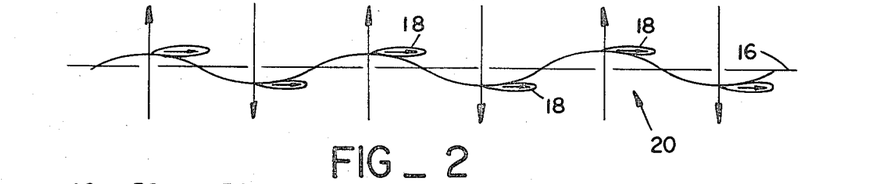
FIG. 2 is a schematic diagram illustrating the motion of an electron in a periodic magnetic field and the formation of a wave-train composed of the combination of the radiation bursts emitted each time the electron is deflected by the field.

Referring to FIGS. 1 and 2, in a uniform magnetic field, the velocity vector, and therefore the cone of radiation sweeps through an angle of 360° in the plane of the orbit. Consequently, the radiated power per mode averaged over an orbit is smaller by a factor of $\gamma$ than in the instantaneous case. This effect is overcome by using a periodic field as shown in FIG. 2.

In a periodic field, the electron oscillates about a straight line or path 16 which defines the axis of the electron beam. Each time the electron is deflected in the magnetic field a short radiation burst 18 is emitted in a cone whose axis is substantially parallel to the axis of the electron beam. Depending on the strength and period of the field and the energy of the electron beam, only a small amount of power radiates at angles measured from the electron beam axis exceeding $1/\gamma$. In other words, full advantage has been taken of the $1/\gamma^2$ dependence of the differential solid angle $d\Omega$ in the mode number equation. The number of optical modes into which the system radiates is therefore reduced by a factor of $\gamma$ as compared to an electron in a uniform field and a factor of $\gamma^2$ as compared to an isotropic radiator.

The radiation emitted in a simple uniform field extends over a wide range of frequencies, in fact, over many octaves. Despite the reduction in the solid angle, this fact leads to a much larger number of modes than for an atomic or molecular laser where the linewidth is usually a fraction of the emission frequency.

However, by deflecting the beam through the alternating magnetic field 20, the radiation emitted from each electron in the beam takes the form of a periodic string of pulses and is confined in wavelength to the spatial separation of the pulses. Harmonics may also be present but do not affect the gain at the fundamental wavelength and will not be considered. A "linewidth" can then be defined as the width of the spectrum of the emitted radiation. The linewidth is determined in part by the homogeneity in energy of the electron beam and by the number of periods in the array. The relative linewidth of the radiation can always be made comparable to the electron beam homogeneity ($\Delta\gamma/\gamma$) by increasing the number of periods.

If the magnet period or magnetic field spacing is $\lambda_q$, the fundamental wavelength $\lambda_f$ of the emitted radiation (corresponding to the spacing between the pulses in FIG. 2 is approximately $$\lambda_f \approx \lambda_q/2\gamma^2 [1 + (\tfrac{1}{3})(\lambda_q/4c)^2 (e_0\beta/mc)^2]$$

Realistic values of $\lambda_f$, based on possible magnet periods and electron energy, extend from a few millimeters to about one Angstrom. It is apparent that the frequency of the radiation can be adjusted either by varying the beam energy $\gamma mc^2$ or by varying the magnetic field strength.

The foregoing description followed classical principles according to which gain and absorption are restricted to special circumstances. The classical approach is best illustrated by considering a single electron or a highly bunched beam passing through the periodic field. Energy is transferred to or extracted from an electromagnetic wave propagating along the beam axis if its electric vector is transverse to the static magnetic field and if its frequency matches that of the transverse oscillations of the electron wherein both quantities are measured in the electron rest frames. Gain or absorption dominates depending on the relative phase of the electron and the wave.

For a continuous electron beam, amplification occurs in the classical case as a consequence of the bunching of the electron beam under the influence of the wave as shown by J. R. Pierce in *Travelling Wave Tubes* (Van Nostrand, 1950). Pierce showed that under special circumstances the wave can rearrange the positions of the electrons in the beam leading to a decrease in the number of electrons absorbing energy from the wave and an increase in the number transferring energy to the wave. Amplification occurs as a result of the spatial rearrangement of the electrons in the beam. The devices proposed by Pierce, known as travelling wave tubes, are in extensive use in the microwave industry but are restricted to long wavelengths because the bunching mechanism becomes less effective as the wavelength is decreased.

Motz' classical analysis correctly predicted the power and spectrum of the spontaneous radiation emitted by the electron beam in the periodic field. He also applied Pierce's theory in an attempt to develop an amplifier. He proposed two distinct devices. The first device used an electron beam which had been bunched to optimize the radiated power prior to its passage through the periodic field. No amplification was involved and the device emitted only incoherent radiation. The second device was based on Pierce's analysis and consisted of a periodically deflected electron beam in a rectangular waveguide. However, Motz found that this method of amplification was not practical for relativistic electrons or at wavelengths less than a millimeter due to failure of the bunching process.

In contrast thereto, the present invention employs quantum physics, in which gain occurs as a consequence of the quantization of the electromagnetic field. Radiation is associated with the emission of a quantum of energy and electron recoil leads to a separation of the frequency of the emission and absorption lines. For a given electron beam energy and magnetic field period absorption predominates at wavelengths shorter than the line center and emission predominates at the longer wavelengths. Amplification occurs over the range of frequencies for which the transition rate for emission exceeds the rate for absorption.

Some degree of bunching may still occur during amplification, referring to Pierce's analysis, or may be introduced during the formation of the electron beam. Such bunching may be effective in increasing the available gain as established below. But the fundamental feature of the invention is that substantial gain is available whether or not the beam is bunched. By bypassing the bunching process as a prerequisite for amplification, the invention substantially and dramatically increases the range of frequencies over which amplifiers using a beam of free electrons can be used.

The Weizsacker-Williams approximation[1] can be used to formulate the gain available for radiation passing through the electron beam in accordance with the present invention. According to this approximation the radiation process associated with the electrons' motion in the magnetic field can be analyzed in terms of the scattering of the photons in an equivalent plane-wave pulse or wavepacket of electromagnetic radiation propagating along the electron beam axis but in a direction opposite that of the electrons in the beam. The structure of the magnetic field in the radiation pulse mirrors in detail the structure of the field in the array along the electron beam axis but at one half the amplitude and twice the physical scale. Accordingly, the wavelength of the radiation in the wavepacket, $2\lambda_q$, is taken to be twice the magnet period while the amplitude, $B_0/2$ is one half the amplitude of the field in the magnet array.

[1] As fully described by J. D. Jackson in "Classical Electrodynamics," pulbished by Wiley, New York (1962), p. 481.

The adoption of the Weizsacker-Williams approximation confirms and complements the classical mechanistic description of the radiation process. In particular, the polarization of the scattered radiation is the same as that in the equivalent radiation pulse which is, in turn, determined by the configuration chosen for the field in the periodic array. Thus, the emitted radiation can be polarized as desired by suitable design of the magnet array.

Radiation is also obtained if a periodic electric field is used instead of a magnetic field. In both instances the physics is essentially identical. However, the largest practically obtainable electric fields are considerably smaller than easily produced magnetic fields of moderate strength. Since the gain decreases with the field strength, the gain with a periodic electric field is relatively small.

Turning now to the results of a mathematical analysis of the magnitude and relationship of stimulated emission and absorption the average gain per meter, $\bar{G}$, is given below:

$$\bar{G} = \frac{2(\log_{10} e) \times 10^3 \text{ cm}}{(\pi)^{7/2}} \frac{r_o^2}{hc} \lambda_f^2 \lambda_q^2 B_o^2 \rho_{eo}$$

$$\cdot \frac{1}{\sqrt{\left(\frac{\Delta\gamma}{\gamma_o}\right)^2 + \left(\frac{\Delta\nu}{2\nu_f}\right)^2}}$$

$$\cdot \left\{ e^{-\frac{\left(\frac{\delta\nu}{2\nu_f}\right)^2}{\left(\frac{\Delta\gamma}{\gamma_o}\right)^2+\left(\frac{\Delta\nu}{2\nu_f}\right)^2}} - e^{-\frac{\left[\left(\frac{\delta\nu}{\nu_f}\right)-\left(\frac{h\nu_f}{\gamma_omc^2}\right)\right]^2}{\left(\frac{\Delta\gamma}{\gamma_o}\right)^2+\left(\frac{\Delta\nu}{2\nu_f}\right)^2}} \right\} h$$

dB/meter wherein:
$e = 2.7183$
$e_o =$ electron change in stat-coulombs
$r_o =$ classical electron radius ($2.8174 \times 10^{-13}$ cm)
$h =$ Planck's constant ($6.625 \times 10^{-27}$ erg - sec)
$c =$ speed of light
$\lambda_f =$ wavelength of emitted radiation
{ $\lambda_f \approx \lambda_q/2\gamma^2 [1 + \frac{1}{3}(\lambda_q/4c)^2 (eB/mc)^2]$ }
$\lambda_q =$ magnet period (spacing between magnets) in centimeters
$B_o =$ field amplitude in gauss (The field is assumed to reverse abruptly between periods).
$\rho_{eo} =$ density of electrons in the electron beam ($2.082^1 \times 10^{10}$ electrons/cm³ for a 1mm² beam cross section with I in amperes)
$\gamma_o mc^2 =$ electron beam energy ($m$ equals the electron rest mass, $9.11 \times 10^{-28}$ gm)
$\Delta\gamma mc^2 =$ energy spread of the electron beam specified between the ($1/e$) points on an assumed gaussian distribution.
$\nu_f =$ frequency of the center of the emission line in Hz
$\Delta\nu_f =$ contribution of the magnet array to the width in Hz of the emission line measured between the $1/e$ points on an assumed gaussian distribution
$\delta\nu_f =$ deviation of the frequency of operation from the center of the emission line in Hz.

Although use of the Weizsacker-Williams approximation is normally restricted to small field amplitudes, the result remains valid for arbitrarily large magnetic fields.

The formula for $\bar{G}$ applies for radiation emitted parallel to the electron beam axis and assumes parallel electron trajectories. The critical quantities are the frequency and amplitude of the scattered radiation which are constant to order $(\gamma\theta)^2$ for small angles. $\theta$ is the angular divergence, measured with respect to the electron beam axis, of the electrons in the beam or the photons in the optical mode into which the electrons radiate. The formula for $G$ applies in the limit in which $(\gamma\theta)^2$ is small in comparison to the relative linewidth of the spontaneously emitted radiation which is $$\sqrt{2 (\Delta\gamma/\gamma_o)^2 + (\Delta\nu/\nu_f)^2}.$$

It should be noted that the gain will be reduced if this limit is exceeded.

The first term in the brackets in the equation for $G$ is due to stimulated emission while the second term in the brackets is due to absorption. The difference between the two terms is due to the electrons' recoil which shifts the frequency of the peak of the absorption line upwards by a frequency equal to $\nu_f \cdot (2h\nu_f/\gamma_o mc^2)$. The shift is traceable to the difference in the electrons' recoil during emission and absorption. It is the presence of this shift which distinguishes the invention from a classical travelling wave tube. If the photon energy is neglected, as in classical electromagnetism, then $(n\nu_f/\gamma_o mc^2) = 0$, the emission and absorption spectra overlap exactly, and there is no possibility of amplification except through Pierce's travelling wave process. Conversely, the presence of the shift yields useful gain at wavelengths where conventional travelling wave amplification is impractical.

For most situations, emission and absorption are so nearly equal that $\bar{G}$ can be approximated by the following equation:

$$\bar{G} \approx -\frac{2(\log_{10} e) \times 10^3 \text{ cm}}{(\pi)^{7/2}} \frac{r_o^2}{hc} \lambda_f^2 \lambda_q^2 B_o^2 \rho_{eo}$$

$$\cdot \left(\frac{h\delta\nu}{\gamma_o mc^2}\right) \cdot \frac{1}{\left[\left(\frac{\Delta\gamma}{\gamma_o}\right)^2+\left(\frac{\Delta\nu}{2\nu_f}\right)^2\right]^{3/2}} \cdot e^{-\frac{(\delta\nu/2\nu_f)^2}{\left(\frac{\Delta\nu}{2\nu_f}\right)^2+\left(\frac{\Delta\gamma}{\gamma_o}\right)^2}}$$

dB/meter

The net gain is positive for frequencies below the line center ($\delta\nu<o$) and negative above the line center ($\delta\nu>o$). The maximum value of $\bar{G}$, $\bar{G}_{max}$, is obtained at the frequency for which:

$$\delta\nu = -\nu_f/\sqrt{2} \sqrt{(2\Delta\gamma/\gamma)^2 + (\Delta\nu/\nu_f)^2}$$

and the gain at this frequency is:

$$\bar{G}_{max} = \frac{2\sqrt{2e} (\log_{10} e) \times 10^3 \text{ cm}}{(\pi)^{7/2}}$$

$$\cdot \frac{r_o^2}{hc} \cdot \lambda_f^2 \lambda_q^2 B_o^2 \rho_{eo} \cdot \frac{1}{\left[\left(\frac{\Delta\gamma}{\gamma_o}\right)^2+\left(\frac{\Delta\nu}{2\nu_o}\right)^2\right]} \cdot \left(\frac{h\nu_f}{\gamma_o mc^2}\right)$$

dB/meter.

Figure 9:
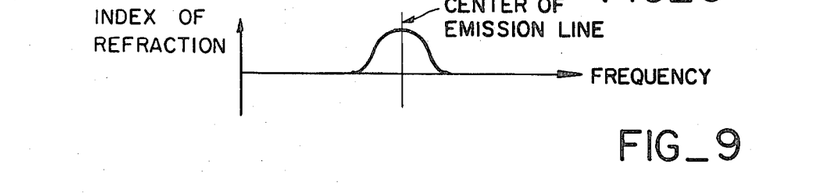
FIG. 9 is a schematic diagram illustrating the variation in the index of refraction for radiation in the electron beam as a function of frequency.

As a consequence of the dependence of the gain on the frequency, the electron beam in the periodic magnetic field has an index of refraction which exceeds unity for frequencies near the center of the emission line. For long wavelengths and large gains the electron beam behaves as a light-pipe for the emitted radiation. The index of refraction at the center of the emission line is given by index of refraction $= 1 + 2/(\pi)^5 r_o^2/mc^2 \lambda_f^3 \lambda_q B_o^2 \rho_{eo}$
$\cdot 1/[(\Delta\gamma/\gamma_o) + (\Delta\nu/2\nu_f)^2]$ FIGS. 9 and 10 illustrate the variation of the gain and of the index of refraction with frequency.

The quantity $(\Delta\nu/\nu_f)$, hereinafter referred to as the field homogeneity or, the periodic field homogeneity, represents the contribution of the structure of the periodic magnet array to the relative linewidth of the spontaneously emitted radiation and can be defined as the relative linewidth which would be observed with a perfectly homogeneous electron beam.

For a perfectly periodic field and operation at low power levels where electron deceleration can be neglected, the field homogeneity can be derived from the square of the Fourier transform of the periodic field amplitude and is approximated by:

$$\Delta\nu/\nu_f \; 0.53/n$$

where $n$ is the number of periods in the array. Departures from periodicity, either in the field amplitude or period, will be reflected in a degradation of both the homogeneity and the gain.

There are occasions when it is desirable to suppress the gain, for example, when imposing amplitude modulation on the emitted radiation. In such a case, the dependence of the gain upon the homogeneity of the electron beam and the magnetic field can be employed to modulate the emitted radiation. The periodicity of the magnetic field can be modified without requiring the introduction of specialized optical elements in the radiation beam as conventionally required for modulation.

The quantity $(\Delta\gamma/\gamma_0)$, hereinafter sometimes referred to as the electron beam homogeneity, denotes the relative contribution of the spread in energy of the electron beam to the emission linewidth. The statistics of the radiation process play a fundamental role in determining $(\Delta\gamma/\gamma_0)$. Two cases are of immediate interest: first, the case in which the gain is small and, second, the case in which the gain is large, stimulated emission is dominant and radiation occurs primarily into a single or closely spaced set of modes. When other contributions to $\Delta\gamma$ are small (including, in particular, the contribution of the electron accelerator), these cases provide limiting values for the homogeneity.

In the first case, when the gain is small, the equilibrium value of $(\Delta\gamma/\gamma_0)$ is approximately:
$(h/2mc)^{1/2} (1/\lambda_f \lambda_q)^{1/4}$
The homogeneity becomes increasingly less favorable at short wavelengths.

In the second case the electron beam is more homogeneous at shorter wavelengths. The result is $(\Delta\gamma/\gamma) = \frac{1}{4}(\Delta\nu/\nu_f)$. Reference to the gain formula indicates that the gain in this case is primarily determined by the homogeneity of the periodic field.

Table I lists typical gains for a variety of operating conditions from the far infrared to the soft X-ray region. The emission linewidth is for a magnet array of 1,000 periods and an electron beam homogeneity appropriate to the low gain case, e.g., for $(\Delta\gamma/\gamma_0)^2 = (h/2mc) \sqrt{1/\lambda_f \lambda_q}$. Useful gain is obtained to wavelengths substantially below 100 A. Also shown in Table I is $G_o$, the gain which would be observed in the absence of absorption. As is more fully discussed below, $G_o$ can have a significant effect on the statistics of the emitted radiation even when the net gain, $\bar{G}$, may be insignificant.

A thorough mathematical analysis of the present invention can be found in the April 1971 issued (published May 10, 1971) of the Journal of Applied Physics, Volume 42, pages 1,906 to 1,913. The subject matter of the cited article is incorporated herein by reference.

Figure 3:
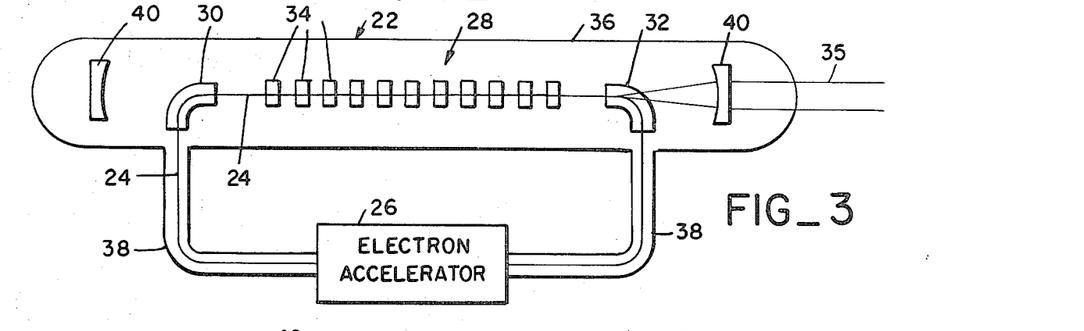
FIG. 3 is a schematic diagram of a laser constructed in accordance with the present invention.

Turning now more specifically to the construction of devices in accordance with the invention and referring to FIG. 3, a laser 22 is shown which employs an electron beam 24 obtained from an accelerator 26. The beam is injected into a periodic magnetic array 28 by an injection magnet 30 and is extracted by an extraction magnet 32 after the beam has traversed the period magnetic field of the array. As discussed above, the magnets 34 of the array are of opposing polarity. The electron beam is enclosed in a vacuum chamber 36 which includes arms 38 connecting the tube with accelerator 26 to minimize gas scattering. Mirrors 40 can be located inside or outside (not shown) of the vacuum chamber. Oscillations results from the above-mentioned stimulated emission of radiation by the electron beam 24 as it passes through the periodic magnetic field due to photons that were previously emitted into the optical modes of the resonator formed by the two mirrors.

Mirrors may not be necessary for oscillation if the gain is high enough. In such an event substantial amplification takes place in a single pass through the device and the mirrors, which serve in part to extend the interaction time of the stimulating radiation and the electron beam, may be eliminated. This is particularly helpful at very short wavelengths because highly reflective mirrors for such wavelengths are difficult to manufacture.

The required electron beam current for gain at short wavelengths is large—in the ampere range—with beam energies of the order of $10^9 - 10^{10}$ electron volts. It is therefore preferred to recirculate the extracted electron beam from the vacuum tube by extraction magnet 28 through accelerator 26. When recirculating the electrons the accelerator has to supply only that energy which was lost, i.e., transformed into radiation when the electron beam passed through the periodic field. Otherwise, the accelerator would have to supply the full beam power, in the above example equal to $10^9 - 10^{10}$ watts.

Referring now to FIGS. 3–7, magnets 34 polarize the emitted radiation 35 linearly. Its electric vector lies in the plane of the drawing. Circularly polarized radiation is obtained with the magnet array 58 illustrated in FIG. 5 which has overlapping ring shaped magnet sections 59 and 60.

Figure 4:
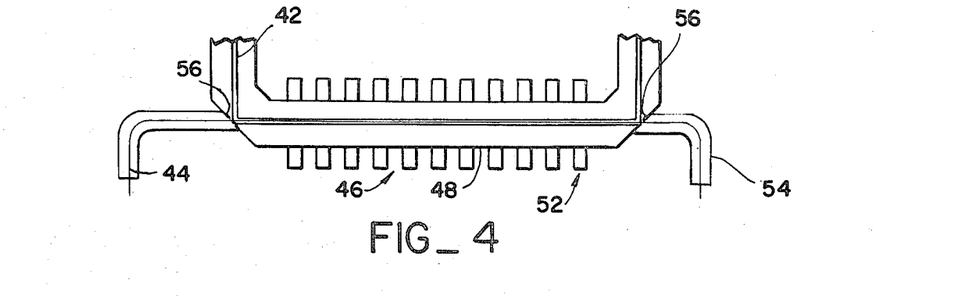
FIG. 4 is a schematic diagram of an amplifier constructed in accordance with the present invention.
Figure 5:
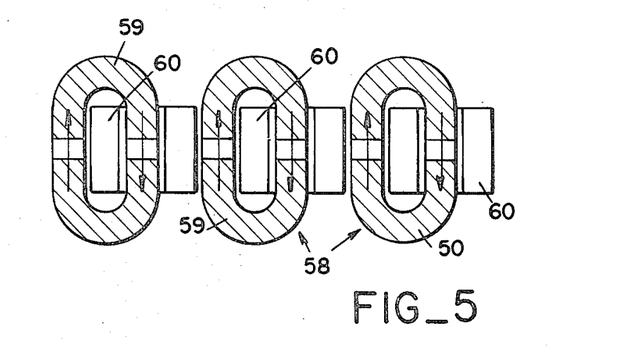
FIG. 5 is a schematic diagram of a magnet structure for the periodic magnet array which provides for the circular polarization of radiation emitted by the laser of FIG. 3.
Figure 6:
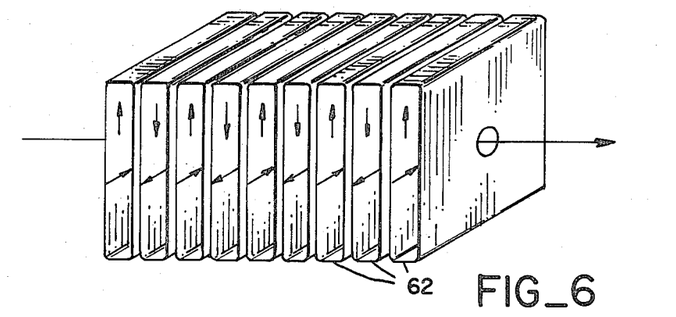
FIG. 6 is a schematic, perspective representation of a superconducting magnet array that can be employed for forming high field strength periodic magnet arrays.

The magnets illustrated in FIGS. 3–5 are simple iron core magnets, other types of magnets can also be used. For applications requiring high field strength current sheets 62 are used to produce a linearly polarized field. Such current sheets are constructed of superconducting wire (not separately shown).

Referring now to FIG. 4, a device constructed in accordance with the invention can also be used as an amplifier 46 by injecting a photon beam 42 (e.g., a laser beam) from an external source parallel to the axis of the electron beam 44. No mirrors are required.

TABLE I

Values of gain ($G_o$) and gain minus absorption ($\bar{G}_{max}$) for some selected values of electron beam energy and current. For all the cases cited, the electron beam cross section is 1.0 mm², the magnet period is 1.0 cm, and the array length 10 meters.

| $\lambda f$ | B | Electron Energy | Beam Current | $(\Delta\gamma/\gamma_o)$ | $(\Delta\nu/\nu_o)$ | $\bar{G}$ | $G_o$ |
|---|---|---|---|---|---|---|---|
| 50μ | 5×10³G | 5.5 MeV | 5mA | 0.41×10⁻⁴ | 5.3×10⁻⁴ | 60dB m⁻¹ | 1.5×10⁶dBm⁻¹ |
| 5000A | 5×10³G | 55 MeV | 0.5A | 1.3×10⁻⁴ | 5.3×10⁻⁴ | 4.9dBm⁻¹ | 1.4×10⁴dBm⁻¹ |
| 5000A | 10⁵G | 436 MeV | 0.5A | 1.3×10⁻⁴ | 5.3×10⁻⁴ | 250dBm⁻¹ | 5.6×10⁶dBm⁻¹ |
| 100A | 10⁵G | 3.1 GeV | 1.0A | 3.4×10⁻⁴ | 5.3×10⁻⁴ | 0.66dBm⁻¹ | 3.1×10³dBm⁻¹ |
| 50A | 10⁵G | 4.4 GeV | 1.0A | 4.1×10⁻⁴ | 5.3×10⁻⁴ | 0.18dBm⁻¹ | 6.7×10²dBm⁻¹ |

The amplifier includes an evacuated tube 48 which is surrounded by the above described magnet array 52. Ends of the evacuated tube are bent 90° and include vacuum arms 54 for recirculation of electron beam 44 to an electron accelerator (not shown in FIG. 4). The laser beam 42 enters the evacuated tube 48 and is projected through the electron beam by end mirrors 56 positioned at 45°. The end mirrors include small holes aligned with the electron beam 44 which permits passage of the electron beam.

In operation amplifier 46 amplifies the power of the laser beam 42 by virtue of the above described stimulated photon emission of the electron beam 44 as it passes the periodic magnetic field.

As a result of the mutual electrostatic repulsion of the electrons in the electron beam, the beam tends to diverge. Alternate gradient or "strong" focusing, schematically illustrated in FIG. 7, can be employed to eliminate electron beam divergence.

Figure 7:
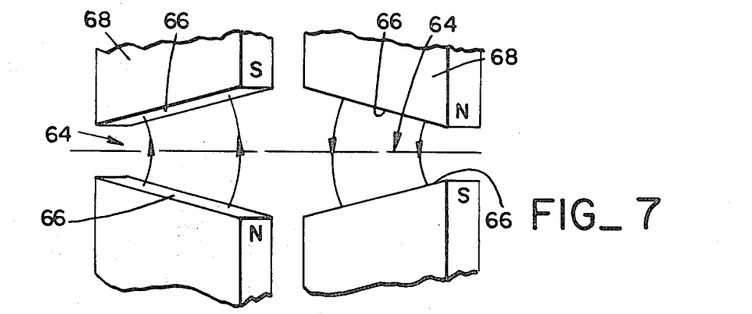
FIG. 7 is a schematic representation of an alternate gradient focusing arrangement for controlling the divergence of the electron beam as it passes through the periodic field.
Figure 8:
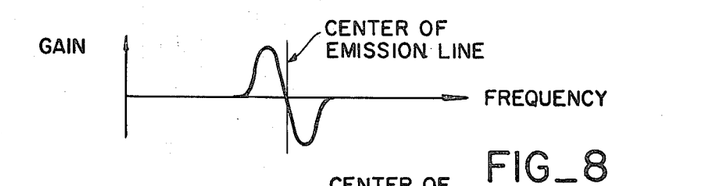
FIG. 8 is a schematic diagram and graphically illustrates the gain obtainable with the laser of the present invention as a function of the frequency of the emitted or amplified radiation.

In alternate gradient focusing the electrons pass through a periodic but non-constant field in which the gradient of the field $\nabla|B|$ reverses direction in succeeding semi-periods. There is then an effective focusing action in which the average correcting force exerted on a particle is proportional to its distance from the axis. This is analgous to the effects of a converging lens in geometrical optics. The introduction of the alternating gradient effectively suppresses beam divergence without appreciably affecting the gain.

Alternate gradient focusing is most conveniently done by using a wedge shaped gap 64 between opposing faces 66 of an iron magnet 68. The illustrated magnet provides for a linear polarization of the radiation beam. For alternate gradient focusing with the current sheets 62 in FIG. 6, the spacing of the windings is changed so that the surface current density varies linearly along the sheet at right angles to the current.

While it is not always necessary to introduce a gradient in all of the gaps in the array, it is inevitable that a significant number of them be so formed to insure beam stability.

As the electrons propagate through the periodic field the loss in energy of the individual electrons due to emission of radiation results in a reduction of $\gamma$. Since the wavelength of the emitted radiation is approximately proportional to the magnet period divided by $\gamma^2$, the wavelength grows as the electrons move downstream if the magnet spacing is constant. If the change in wavelength is small in comparison to the linewidth of the spontaneously emitted radiation when the radiated power is small, there is no noticeable change in the operation of the system. The linewidth when deceleration can be neglected is $\lambda_f \cdot \sqrt{(2\Delta\gamma/\gamma)^2 + (\Delta v/v_f)^2}$.

However, if the change in wavelength is larger than the low-power linewidth, the number of coupled modes and the overlap of the emission and absorption lines increases and the gain drops. To compensate for this drop the magnet spacing or period is increased in a downstream direction of the electron beam as a function of $\gamma^2$. In this manner the wavelength of the emitted radiation remains constant. Compensation is also possible through control of the magnetic field strength or through a combination of the two parameters.

Referring again to FIGS. 3 and 4, when the laser 22 or amplifier 46 are operated at very long wavelengths, for example, in the millimeter and far infrared regions, the effective diameter of the modes in the optical cavity becomes large. This leads to a deterioration in the coupling between the radiation and the electrons in the beam and, therefore, to a loss of gain. Two possible cases are encountered. First, as a result of the variation of the gain with frequency, the electron beam, while in the periodic magnetic field, has an effective index of refraction which is greater than unity. If the gain is large enough, the radiation is trapped within the electron beam and no further modification is necessary. Secondly, at lesser gain the radiation can stray outside the electron beam resulting in a corresponding loss of coupling and a reduction in gain. The coupling loss can be reduced by enclosing the electron beam in a tubular, non-magnetic waveguide whose dimensions fix the maximum diameter of the radiation. The wave guide can replace the evacuated tube 48 shown in FIG. 4.

Short wave lengths lasers constructed in accordance with the preceding description are capable of operating at wavelengths as short as 1 A and at a continuous power as high as 5 megawatts. Moreover, they are highly efficient because virtually all energy given up by the electron beam is transformed into radiation.

If the beam is tightly bunched the radiation emitted by the electrons in the bunch is in phase and the radiated power and the gain are significantly enhanced. The ratio of the extra gain obtained with a bunched beam to the gain for a continuous electron beam is given approximately by:

$$\frac{\text{bunched gain}}{\text{continuous gain}} \approx \frac{2.1 \, l \, \lambda_q \times 10^8}{(4\pi)^2} e^{-\frac{2\pi^2\gamma^4 l^2}{\lambda^2_q}}$$

where $l$ is the length of the electron bunch. The other symbols have previously been defined. The effect of bunching on radiation is negligible unless $\gamma^2 l/\lambda_q \leq 1$, as when operating in the millimeter region with tight bunching. But when $\gamma^2 l/\lambda_q < 1$ the gain can be substantially larger than in the case of a continuous beam.

It should also be noted that since the difference between gain and absorption of the radiation in the electron beam is small, stimulated emission may persist in the periodic magnetic field even though there is little useful gain. Even when there is no net gain, the square of the standard deviation of the number of photons, $n$, counted in an interval of time is given by:

$<n^2> - <n>^2 = <n> \, 1 + (G_o L/20 \, log_{10} e)$ where $G_o$ is the gain if absorption were neglected (values of $G_o$ are tabulated in Table (1) and $L$ the length of the array. This quantity differs by the factor $G_o L/20 \, log_{10} e$ from what would have been calculated if the photons were radiated independently.

The action of stimulated emission under these circumstances can be interpreted as converting the completely incoherent radiated beam which would be obtained if the photons were radiated independently to a partially coherent beam in which identical photons tend to be emitted in bursts as allowed by statistical fluctuations in the stimulated emission and absorption processes. The device thus remains a useful source of partially coherent radiation when the gain is inadequate for laser action.

What is claimed is:

1. A continuously tunable apparatus for the high efficiency generation and amplification of coherent radiation comprising means for generating and directing a relativistic electron beam along an axis and means for periodically deflecting the electrons in said beam transversely of said axis to establish a condition where the transition rate for emission at a given frequency exceeds the rate for absorption whereby a net gain is available for radiation at said given frequency passing through or originating in said beam.

2. A laser according to claim 1 wherein the deflecting means comprises a plurality of linearly arranged successive magnets generating a magnetic field of alternating polarity to periodically deflect the electrons in said beam about a straight line path defined by said axis.

3. A laser according to claim 2 including mirror means defining a radiation cavity aligned with the path.

4. A laser according to claim 1 including means for injecting a beam of radiation into the electron beam for amplification of the radiation beam.

5. A laser according to claim 1 wherein said means for deflecting includes means for generating and amplifying polarized radiation.

6. A laser comprising a source of relativistic electrons, and radiation generating means separating the absorption and emission spectra of the electrons and inducing the electrons to emit directionalized radiation of a relatively narrow frequency range whereby a resulting radiation beam is coherent.

7. An apparatus for generating and amplifying coherent radiation comprising means for generating and directing a relativistic electron beam along an axis, means for focusing the beam, a periodic magnet array positioned adjacent said axis to periodically deflect the electron beam transversely of said axis and establish a condition where the transition rate for stimulated emission exceeds the rate for absorption, whereby a net gain is available at the emission frequency and substantially all the energy removed from the beam as it passes through the array is transformed into coherent radiation.

8. Apparatus according to claim 7 including means for recirculating the electron beam through the magnet array comprising means for injecting and extracting relativistic electrons along said axis and means for accelerating the electron beam after extraction to make up the electron beam energy radiated during its previous passage through the array.

9. Apparatus for generating coherent radiation in the X-ray range comprising means for generating and directing a relativistic electron beam along an axis, a multiplicity of magnets arranged in a linear array along said axis for generating a transverse magnetic field of alternating polarity for deflecting the electrons in said beam transversely of said axis to establish a condition where the transition rate for emission exceeds the rate for absorption whereby a net gain is available, and means for adjusting said apparatus to provide a wavelength for the coherent radiation of no more than about 1,000 Angstroms.

10. Apparatus according to claim 9 wherein the means for adjusting provides a wavelength of the coherent radiation of no more than about 100 Angstroms.

11. Apparatus according to claim 9 wherein the wavelength of the radiation is given approximately by $$\lambda_f = \lambda_q/2\gamma^2 \cdot [\ 1 + \tfrac{1}{3}\ (\lambda_q/4c)^2\ (e_oB/mc)^2]$$

wherein $\lambda_q$ is the magnet spacing, $\gamma$ is a function of the electron beam energy, $e_o$ is the electron charge in statcoulombs, $c$ is the speed of light in centimeters per second, $B$ is the magnetic field amplitude in gauss and $m$ the electron rest mass in grams, and said adjusting means comprises means for varying at least one of the electron beam energy, the magnet spacing, or the amplitude of the magnetic field to vary the wavelength of emitted radiation.

12. A high efficiency laser for continuous operation at X-ray wavelengths comprising a linear array of equally spaced magnets of alternating polarity for providing an alternating magnetic field transverse of a given path, means for introducing a relativistic high energy electron beam into the magnetic field of the magnets along said path for generating and amplifying collimated and narrow-band X-ray radiation from the periodically deflected electrons in said beam which provide a net gain due to the difference in the frequency dependence of the transition rates for stimulated emission and absorption and means for adjusting the laser for operation at variable power levels.

13. A laser according to claim 12 including means for injecting the electron beam along said path into the magnetic field and means for withdrawing the electron beam from the magnetic field.

14. A laser according to claim 13 including mirrors aligned to be substantially perpendicular to said path of the electron beam and positioned exteriorly of the injection and extraction means.

15. Apparatus according to claim 12 including tubular, non-magnetic means disposed about the electron beam in the magnetic fields, the tubular means defining a waveguide supporting a transverse electromagnetic wave for coupling the radiation beam with the electron beam when the diameter of the radiation beam exceeds the diameter of the electron beam to thereby optimize gain.

16. A laser according to claim 12 including means for polarizing emitted radiation.

17. A laser according to claim 12 wherein the magnets comprise superconducting electro-magnets.

18. A laser according to claim 12 wherein the spacing of the magnets in a downstream direction of the electron beam decreases as a function of the loss of electron beam energy in the downstream direction to maintain the frequency of the emitted radiation constant.

19. A tunable, high power, high efficiency laser comprising: means providing a beam of relativistic electrons along a given path, means located along said path for deflecting said relativistic electrons to provide radiation emission from said deflected electrons coupled with the attendant recoil of said electrons upon emission, said means for deflecting being so located and so spaced as to provide a substantially unidirectional beam of coherent radiation directed along said given path, means for supplying power to said beam of relativistic electrons to provide an output power in said beam of coherent radiation of at least one million watts at a frequency determined by the energy of the electrons in said electron beam and the location and spacing of said deflecting means, and means for varying the frequency of the output coherent radiation.

20. A laser according to claim 19 wherein the frequency varying means comprises means for varying the electron beam energy.

21. A laser according to claim 19 wherein the frequency varying means comprises means for adjusting the location and position at which the electrons are deflected.

22. A laser according to claim 21 wherein the recoiling means comprises a linear array of magnets, adjacent magents having opposite polarities, and wherein the frequency adjusting means comprises means for changing the magnetic field in the magnet array.

23. A method for producing a high powered beam or coherent radiation of a frequency between about the infrared, and the X-ray regions comprising the steps of emitting a relativistic electron beam, inducing a shift in the radiation absorption spectrum of electrons in the beam with respect to the radiation emission spectrum of electrons in the beam, to cause the emission of directionalized radiation and to obtain an average radiation gain $G$ per meter equal to:

$$G = \frac{2(\log_{10} e) \times 10^3 \text{ cm}}{(\pi)^{7/2}} \frac{r_o^2}{hc} \lambda_f^2 \lambda_q^2 B_o^2 \rho_{eo}$$

$$\cdot \frac{1}{\sqrt{\left(\frac{\Delta\gamma}{\gamma_o}\right)^2 + \left(\frac{\Delta\nu}{2\nu_f}\right)^2}}$$

$$\cdot \left\{ e^{-\frac{\left(\frac{\delta\nu}{2\nu_f}\right)^2}{\left(\frac{\Delta\gamma}{\gamma_o}\right)^2 + \left(\frac{\Delta\nu}{2\nu_f}\right)^2}} - e^{-\frac{\left[\left(\frac{\delta\nu}{\nu_f}\right) - \left(\frac{h\nu_f}{\gamma_o mc^2}\right)\right]^2}{\left(\frac{\Delta\gamma}{\gamma_o}\right)^2 + \left(\frac{\Delta\nu}{2\nu_f}\right)^2}} \right\}$$

dB/meter, wherein:
 $e = 2.7183$
 $r_o$ = classical electron radius ($2.8174 \times 10^{-13}$ cm)
 $h$ = Planck's constant ($6.625 \times 10^{-27}$ erg − sec)
 $c$ = speed of light ($2.998 \times 10^{10}$ cm sec$^{-1}$)
 $\lambda_f$ = wavelength of emitted radiation in cm
 $\lambda_q$ = magnet period in cm
 $B_o$ = magnetic field, amplitude in gauss assuming an abruptly reversing field
 $\rho_{eo}$ = density of electrons in the electron beam ($2.082$ $I \times 10^{10}$ electrons per cm$^3$ for a 1mm$^2$ electron beam cross section with $I$ in amperes)
 $\gamma_o mc^2$ = electron energy in ergs where $m$ is the electron rest mass ($m = 9.11 \times 10^{-28}$ gm)
 $\Delta\gamma mc^2$ = energy spread of the electrons specified between the ($l/e$) points on an assumed gaussian distribution
 $\nu_f$ = frequency of the center of the emission line in Hz.
 $\Delta\nu_f$ = contribution of the magnet array to the width in Hz of the emission line measured between the $l/e$ points on an assumed gaussian distribution
 $\delta\nu_f$ = deviation of the frequency of radiation from the center of the emission line in Hz.

24. A method according to claim 23 including the steps of selecting an electron energy and selecting a period for the magnetic field which maximizes the difference between the transition rates for stimulated emission and absorption by the electrons to obtain a maximum gain $$G_{max} = \frac{2\sqrt{2e} (\log_{10} e) \times 10^3 \text{ cm}}{(\pi)^{7/2}} \frac{r_o^2}{hc} \lambda_f^2 \lambda_q^2 B_o^2 \rho_{eo}$$

$$\cdot \frac{h\nu_f}{\gamma_o mc^2} \frac{1}{\left[\left(\frac{\Delta\gamma}{\gamma_o}\right)^2 + \left(\frac{\Delta\nu}{2\nu_f}\right)^2\right]}$$

dB/meter.

25. A lasing method for a given frequency domain comprising the steps of generating a relativistic electron beam, directing said beam along an axis, periodically deflecting the electrons in said beam with alternating magnetic fields along said axis to cause the electrons' emission and absorption spectra to be separated in said given frequency domain to thereby obtain continuous unidirectional gain which is a function of the electron energy and beam power as well as the magnitude and direction of the magnetic fields.

26. A method according to claim 25 including the step of varying at least one of the energy of the electrons in said beam energy, the rate at which the electrons within said beam are deflected, and the magnitude of the magnetic field to thereby change the frequency of the radiation beam and wherein the frequency of the emitted radiation is given approximately by $$\lambda_f \times \frac{\lambda_q}{2\gamma^2} \left[ 1 + \frac{1}{3}\left(\frac{\lambda_q}{4c}\right)^2 \left(\frac{e_o B}{mc}\right)^2 \right]$$

and wherein $\lambda_q$ is the period of the deflections in cm, $\gamma$ is a function of the electron energy, $c$ is the speed of light in cm/sec, $e_o$ is the electron charge in statcoulombs, $B$ is the field strength and m the electron rest mass.

27. A method according to claim 25 wherein the step of deflecting comprises the step of deflecting the electrons in said beam at a rate so that the wavelength of the radiation is in the X-ray range.

28. A method according to claim 25 wherein the step of deflecting comprises the step of deflecting the electrons in said beam at a rate so that the wavelength falls within the infrared to X-ray range, and wherein the step of generating the electron beam comprises the step of generating an electron beam of sufficient current so that the output radiaton has a power in excess of 1 megawatt.

29. A method according to claim 25 wherein the steps of generating and of deflecting are selected to form a continuous radiation beam.

30. A method according to claim 25 wherein the step of generating the electron beam comprises the step of generating a bunched electron beam.

31. A method according to claim 25 including the step of periodically focusing the electron beam to maintain a substantially constant average electron beam cross section.

32. A method according to claim 25 wherein the radiation has a wavelength range from the infrared to the millimeter region and wherein the step of deflecting the electrons within the beam includes the step of enclosing the electron beam in a waveguide to restrict the cross section of the radiation beam to a predetermined multiple of the electron beam diameter.

33. A method according to claim 25 wherein the step of deflecting comprises the step of deflecting the electrons within the beam in the downstream direction of the electron beam at an increasing rate to compensate for the electrons' deceleration and thereby form a radiation beam having a substantially constant frequency.

34. A method for securing gain due to the stimulated emission of radiation comprising the steps of moving a multiplicity of electrons at relativistic speed along a path, undulating said electrons along said path to shift the electrons' radiation emission spectrum downwards in frequency relative to their absorption spectrum, and propagating said radiation along the path to amplify the radiation as a result of the prevalence of stimulated emission over absorption over a narrow range of frequencies below the line center for emission.

35. A method according to claim 34 wherein the step of amplifying comprises the step of recirculating previously emitted radiation into the electron beam.

36. A method according to claim 35 wherein the step of recirculating comprises the step of reflecting the radiation into the electron beam at an upbeam location.

37. A method according to claim 34 wherein the step of amplifying comprises the step of directing an external radiation beam into the electron beam.

38. A method according to claim 34 wherein the step of amplification comprises the step of increasing the photon density in a downstream direction of the electron beam with photons emitted at an upstream point.

39. A method for generating or amplifying radiation comprising the steps of moving high energy electrons along a path, repeatedly inducing the electrons to radiate during their movement over the length of the path, and employing the difference between the radiation frequency emitted by the electrons and the radiation frequency absorbed by the electrons to form a unidirectional beam of radiation for which the rate of stimulated emission by the electrons exceeds the rate of absorption of the electrons.

40. A method according to claim 39 wherein the step of inducing comprises the step of periodically deflecting the electrons during their movement along the path.

41. A method according to claim 39 including the step of stimulating the emission of radiation by increasing the photon density in the electron path.

42. A method according to claim 40 wherein the step of deflecting comprises the step of moving the electrons through a periodically reversed magnetic field.

43. A method according to claim 40 wherein the step of deflection comprises the step of moving the electrons through a periodically reversed electric field.

44. A method according to claim 42 including the step of varying the frequency of the emitted radiation by adjusting the spacing of the period of the magnetic field.

45. A method according to claim 25 including the step of focusing the electron beam to direct the electrons in the beam along the magnet axis.

* * * * *